[11] 3,632,869

[72] Inventors Robert Alfred Bartolini
　　　　　　 Trenton;
　　　　　　 Michael Jay Lurie, East Brunswick, both of N.J.
[21] Appl. No. 879,660
[22] Filed Nov. 25, 1969
[45] Patented Jan. 4, 1972
[73] Assignee RCA Corporation

[54] PARTIALLY OVERLAPPING HOLOGRAM MOTION PICTURE RECORD
　　　 5 Claims, 5 Drawing Figs.
[52] U.S. Cl. .................................................. 178/6.8,
　　　　　　　　　　　　　　　　　　　　　　 350/3.5
[51] Int. Cl. ............................................... G02b27/00,
　　　　　　　　　　　　　　　　　　　　　　 H04n 3/00
[50] Field of Search ........................................ 350/3.5;
　　　　　　　　　　　　　　　　　　　　　　 178/6.5, 6.8

[56] References Cited
　　　　　　 FOREIGN PATENTS
1,139,955   1/1969   Great Britain ................ 350/3.5

OTHER REFERENCES
Reid, High-Speed Photography– Proc of the 8th International Congress– Stockholm, June 1968, pp. 314–316

*Primary Examiner*—David Schonberg
*Assistant Examiner*—Ronald J. Stern
*Attorney*—Edward J. Norton ABSTRACT: In a motion picture record in which successive frames of a motion picture are manifested by a series of successive holograms, such as phase holograms, greater redundancy and a saving in record material are achieved by having each one of the holograms partially overlap both the hologram which immediately precedes and the hologram which immediately succeeds that hologram in the series. The problem of unwanted spatial beat frequencies, which results from such overlap and is dependent on the amount of such overlap, can be eliminated by restricting the amount of overlap to a value such that the minimum spatial beat frequency is less than the ultimate resolution of the playback system (e.g. closed circuit television) employed in reconstructing the motion picture from the motion picture record.

PATENTED JAN 4 1972  3,632,869

— NON-OVERLAPPING PHASE HOLOGRAM —
— MOTION PICTURE TAPE —

— OVERLAPPING PHASE HOLOGRAM —
— MOTION PICTURE TAPE —

— RECORDING SYSTEM —

INVENTORS
Robert A. Bartolini and
Michael J. Lurie.
BY George J. Seligsohn
ATTORNEY

—PLAYBACK SYSTEM—

INVENTORS
Robert A. Bartolini and
Michael J. Lurie.
BY George J. Seligsohn
ATTORNEY

PARTIALLY OVERLAPPING HOLOGRAM MOTION PICTURE RECORD

This invention relates to holography and, more particularly, to motion picture records in which the frames of a motion picture are manifested by a series of successive holograms.

A technique has been developed for mass producing record pressings in which a record pressing, such as a vinyl disk or tape, has a series of phase holograms impressed therein which manifest the pictorial information in successive frames of a motion picture.

Briefly, in accordance with this technique, each of the successive frames of a motion picture are respectively recorded, in turn, in holographic form as separate ones of a series of phase holograms arranged in a predetermined format on an optical-recording medium, such as a photoresist for instance. This provides a master recording from which a metallic mold of the series of phase holograms may be built up by a process which may include the steps of electroless plating or vacuum deposition of a thin metallic layer which faithfully copies the phase hologram master recording, followed by an electroplated metallic backing for this layer. This metallic mold may be employed in mass producing, by pressing, replications of the master recording on a plastic medium such as vinyl.

Playback means, including a readout beam source, such as a laser, means for moving the pressed record with respect to the readout beam and a closed circuit television system responsive to the reconstructed phase holograms of the series, may be employed to view the motion picture recorded in holographic form on the pressed record.

In the past, it has been the practice to record successive ones of the phase holograms in the series in juxtaposed, nonoverlapping, substantially contiguous relationship with respect to each other.

It has now been found that certain advantages result if the format is changed so that successive ones of the phase holograms in the series are recorded in partially overlapping relationship with respect to each other. Among these advantages is the fact that the required amount of material to record a series of a given number of successive holograms, each of a given size, is reduced in accordance with the amount of overlap between adjacent holograms. One consequence of this is that in the case where a series of phase holograms is oriented along the length of a tape, so that the metallic mold and the pressed record are also in the form of a tape, a greater number of holograms may be impressed in a given time at any given speed (inches per second) of the tape movement. This increases the output of the impressing machinery. Another consequence is the fact that the tape may be moved at a slower speed during playback, so that it takes a smaller length of tape to provide a given program time. A second advantage of partially overlapping phase holograms is the fact that any flicker effect which may be present in playing back the prior art series of nonoverlapping phase holograms, due to possible spacing, which may exist between the end of a preceding hologram and the beginning of the next succeeding hologram, is eliminated. However, the most important advantage to be gained by partially overlapping successive ones of the series of phase holograms is the increased signal-to-noise ratio achieved by the greater redundancy which results therefrom.

Although partially overlapping successive phase holograms in the series of phase holograms provides all of the above set forth advantages, it also may produce an undesired result. In particular, partially overlapping successive phase holograms cause the playback reconstructed image of any of these holograms to contain unwanted spatial beat frequencies having a minimum value which depends upon the amount of overlap between adjacent phase holograms in the series. However, this problem may be obviated by limiting the amount of overlap between successive phase holograms to a value which makes the resulting minimum spatial beat frequency no less than the ultimate resolution of the playback system.

It is therefore an object of the present invention to provide an improved motion picture record system in which successive frames of a motion picture are manifested by a series of successive phase holograms on a record and in which each one of the phase holograms partially overlaps both the phase hologram which immediately precedes and the phase hologram which immediately succeeds that one of the phase holograms in the series.

This and other objects, features and advantages of the present invention will become more apparent in the following detailed description taken together with the accompanying drawing, in which.

Figure 1:
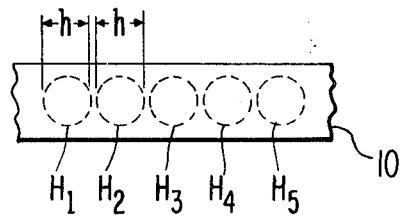
FIG. 1 is a schematic showing of a strip of tape on which prior art nonoverlapping phase hologram motion pictures have been recorded.
Figure 2:
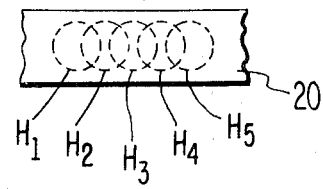
FIG. 2 is a schematic showing of a section of tape on which overlapping phase hologram motion pictures have been recorded in accordance with a technique of the present invention.

Referring now to FIGS. 1 and 2, FIG. 1 shows five successive holograms, $H_1$-$H_5$, of a series of such holograms oriented along the length of tape section 10, while FIG. 2 shows the same five holograms $H_1$-$H_5$ oriented along the length of tape 20. In FIG. 1, the five holograms are arranged, as in the prior art, in nonoverlapping relationship, while in FIG. 2 the five holograms are arranged in accordance with the present invention in partially overlapping relationship. As shown, in both FIGS. 1 and 2, the respective holograms of the series are substantially the same size as each other.

Although in practice the shape of each individual hologram is normally rectangular, it has been shown as circular in both FIGS. 1 and 2. The reason for doing this is that partially overlapping circles may be shown with much greater clarity than partially overlapping rectangles. Since FIGS. 1 and 2 are schematic showings, and the particular shape of each of the series of phase holograms does not form part of the present invention, it is to be understood that the shape of each of holograms $H_1$-$H_5$ in both FIGS. 1 and 2 may be rectangles of the same size as each other, rather than circles as shown schematically in FIGS. 1 and 2.

A comparison of FIG. 2 with FIG. 1 shows that the five partially overlapping holograms $H_1$-$H_5$ occupy a smaller distance along the length of tape section 20 of FIG. 2 than that occupied by the series of similar nonoverlapping holograms $H_1$-$H_5$ along the length of tape section 10 of FIG. 1.

Figure 3:
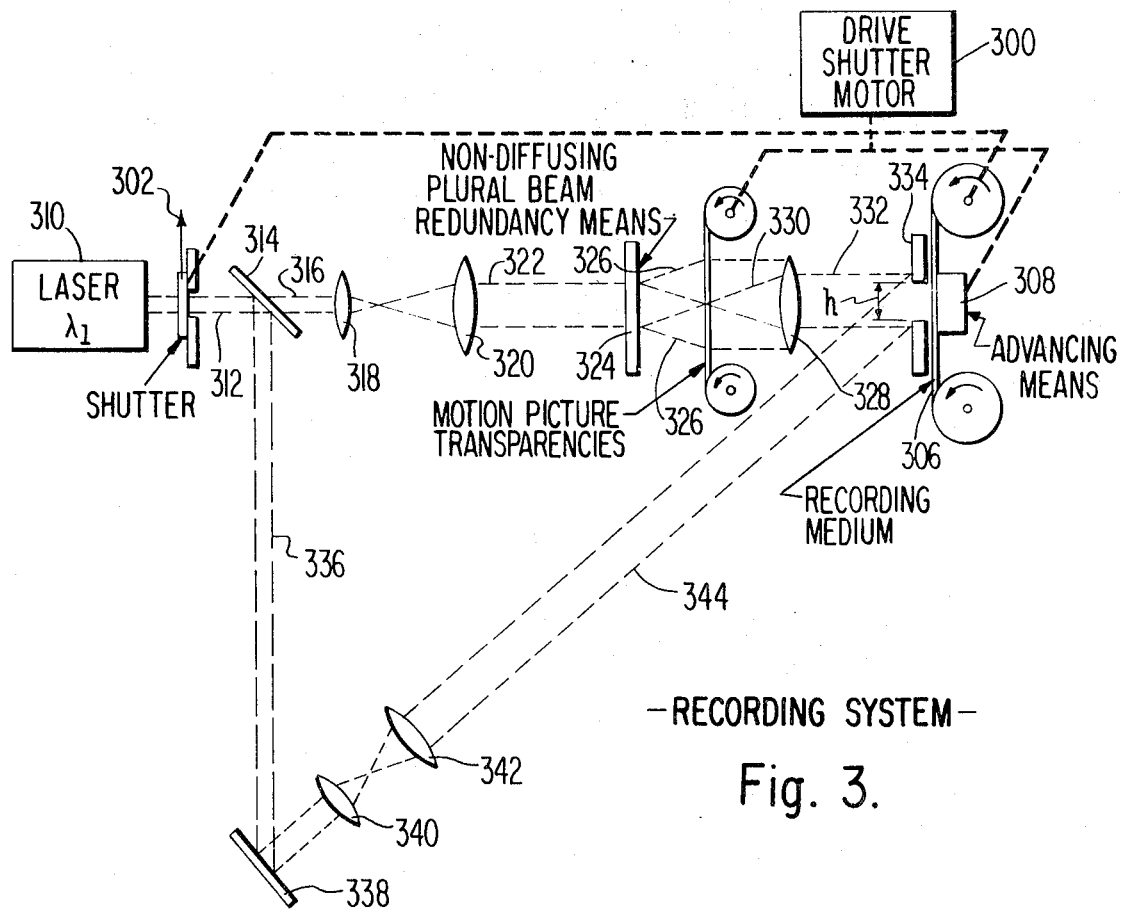
FIG. 3 is a diagram of a recording system for recording a series of phase holograms manifesting the frames of a motion picture.

Referring to FIG. 3, there is shown a preferred embodiment of a system for recording holograms in the format shown in either FIG. 1 or in the format of FIG. 2. In FIG. 3, drive shutter motor 300, as indicated by dashed lines, mechanically controls the operation of shutter 302 and the movement of motion picture transparencies 304, as well as the motion of recording medium 306, which is shown as a length of tape covered with a layer of photoresist, by advancing means 308 coupled to medium 306.

Laser 310 operates at a wavelength $\lambda_1$. In response to a momentary opening of shutter 302, laser 310 applies a beam of wave energy 312 to beam splitting partially reflecting mirror 314. The first component of wave energy 316 is transmitted through beam splitter 314, then is enlarged by a beam enlarger including lenses 318 and 320 to form a relatively wide collimated beam of wave energy 322. Nondiffusing plural beam redundancy means 324, which may be composed of a two dimensional phase grating having a certain line spacing or, alternatively, a beam-splitting mirror system or an optical tunnel, transforms collimated beam 322 into a discrete number of partially overlapping beams of wave energy 326 which are slightly angularly displaced from each other. The position of motion picture transparencies is such that a single frame of the motion picture is simultaneously illuminated by all of the discrete number of beams 326. This frame is oriented in the focal plane of convex lens 328. Therefore, the plurality of redundant information beams 330 emerging from the motion picture transparency frame then being illuminated by the plural beams 326 is transformed into parallel information beams 332 by lens 328. Aperture plate 334, having an aperture of a certain area for passing a portion of information beams 332 located directly in front of a first given area of recording medium 306, which is then in cooperative relationship therewith. The aperture in aperture plate 334 has a dimension of length "$h$" in a direction parallel to the direction of motion of recording medium 306. Therefore, only a first given area of recording medium 306 having this length dimension "$h$" is exposed by the wave energy from information beams 332 impinging thereon.

A second component of wave energy 336 is reflected by beam splitting mirror 314, and is then further reflected by mirror 338 and enlarged by a beam enlarger including lenses 340 and 342 to form collimated reference beam 344. The direction of reference beam 344 is such as to also expose the first area of recording medium 306 which is in cooperative relationship with the aperture of aperture plate 334. This exposure of the first area of recording medium 306 takes place simultaneously with the exposure thereof by information beams 332 when shutter 302 is momentarily opened by drive shutter motor 300. This results in a holographic interference pattern being recorded on this first given area of recording medium 306.

After a hologram interference pattern is recorded on a first given area of recording medium 306, advancing means 308 may be operated by drive shutter motor 300 to move recording medium 306, which is in the form of a tape, a given distance in a direction oriented along the length of the tape. This causes a second given area of recording medium 306 to be brought into cooperative relationship with the aperture in aperture plate 334. Shutter 302 may then be operated momentarily again to record the next succeeding hologram interference pattern in the series of holograms to be recorded.

The pictorial information in each successive frame of motion picture transparency 304 may be manifested by one or more successive holograms in the recorded series of holograms. For instance, since motion pictures are designed to operate at 24 frames per second while television is designed to operate at 60 fields or 30 frames per second, for synchronization purposes it might be desirable to employ the same given frame of the motion picture to record each of the first three of a group of five successive holograms of the series of holograms to be recorded and then employ the next succeeding frame of the motion picture to record each of the last two of these five successive holograms. In this case, the holograms would be played back at a rate of 60 holograms per second, which is equal to the field rate of a standard television system. In any case, drive shutter motor 300 is effective in moving each successive frame of motion picture transparencies 304 into cooperative relationship with beams 326 at an appropriate time to cause the entire series of recorded holograms to correspond in informational content with the motion picture depicted by the successive transparency frames.

Figure 5:
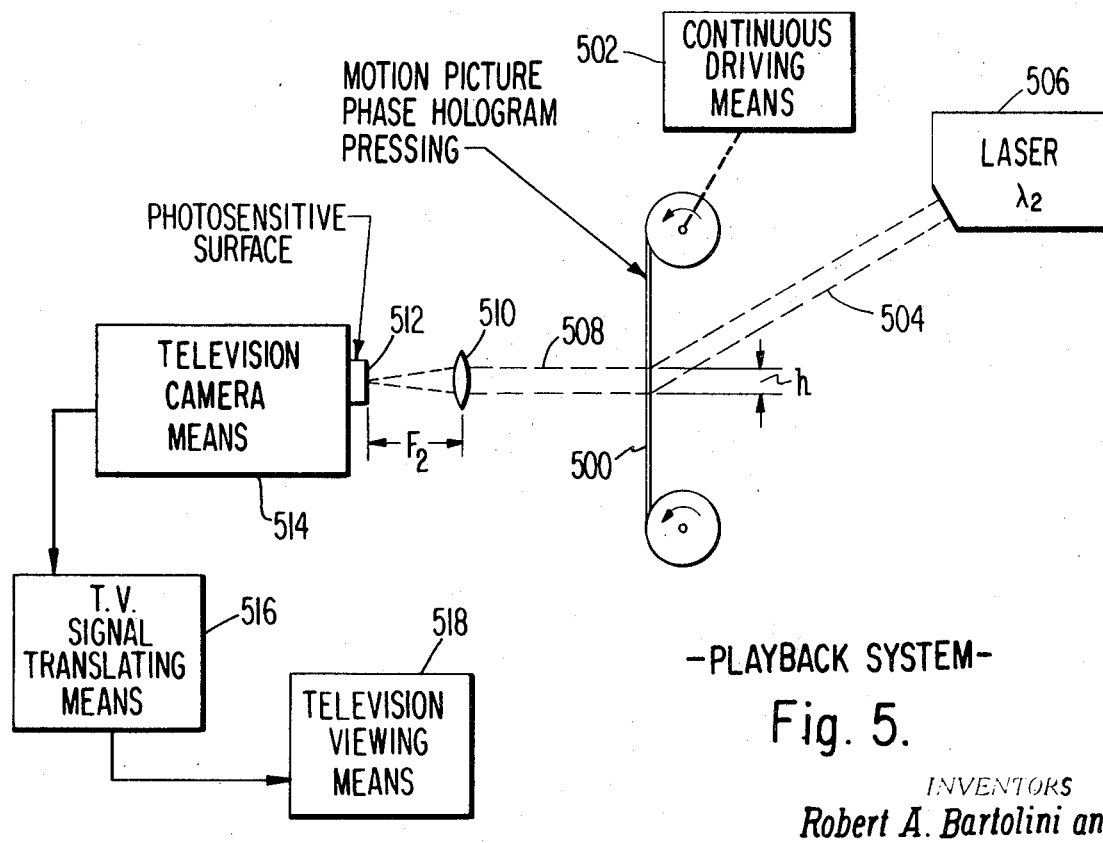
FIG. 5 is a diagram of a playback system for playing back a motion picture record on which successive frames of the motion picture are manifested by a series of phase holograms.

In FIG. 3, the purpose of placing lens 328 one focal length in front of the frame of motion picture transparency 304 being recorded, so that this frame of motion picture transparency 304 lies in the focal plane of lens 328, is to provide an effective object distance for information beams 332 which is infinite. This results in each of a series of recorded holograms being a so-called Fraunhoffer hologram. The desirability of employing Fraunhoffer holograms will become apparent later when the playback system of FIG. 5 is discussed in detail below.

The purpose of nondiffusing plural beam redundancy means 324 in FIG. 3 is to provide a certain amount of desired redundancy in each recorded hologram interference pattern of the series, without concomitantly producing the unwanted speckle noise in the reconstructed image of such a hologram interference pattern which would result if a diffusing redundancy means were utilized. Such a nondiffusing plural beam redundancy means forms the subject matter of copending U.S. Pat. application Ser. No. 662,822, filed Aug. 23, 1967.

Figure 4:
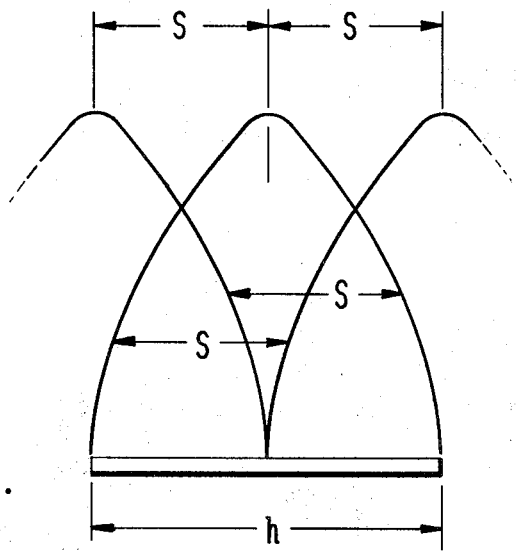
FIG. 4 is a graph showing the effects of the nondiffusing plural beam redundancy means of FIG. 3.

Briefly, as disclosed in this copending patent application, by means of a phase grating having an appropriate line spacing or, alternatively, by means of an appropriate arrangement of a plurality of mirrors, each hologram may be composed of a discrete number of partially overlapping subholograms. For instance, in FIG. 4 is "$h$" is the length of the aperture of aperture plate 334, parallel information beams 332 may include three similar partially overlapping information beams in the vertical plane. Each of these beams has a cross sectional dimension in the vertical plane substantially equal to the length "$h$." The central one of these beams is symmetrically disposed with respect to the aperture of aperture plate 334 so that it illuminates substantially the entire area of recording medium 306 then in cooperative relationship with the aperture. However, each of the lateral beams in FIG. 4 are so situated that only one-half the beam coincides with the aperture in aperture plate 334. Thus, as shown in FIG. 4, the three information beams provide a redundancy of two, with corresponding points on any two of these beams being displaced from each other by a distance "$s$," which is equal to one-half the length "$h$." Each of the three beams gives rise to its own partially overlapping subhologram interference pattern during the recording of each respective one of the holograms of the series.

FIG. 4 is confined to only a single dimension, i.e., the vertical dimension. However, if nondiffusing plural redundancy means 324 is a two dimensional phase grating, for instance, partially overlapping information beams arranged in a direction into the paper may also be achieved. In this case, nine partially overlapping information beams 332 will be obtained to provide an overall redundancy of four.

By resorting to a more complex arrangement of mirrors, the total number of partial overlapping information beams may be slightly increased with an accompanying slight increase in the amount of redundance achieved. However, any attempt to significantly increase the amount of redundancy by the use of a nondiffusing plural beam redundancy means requires such complex optics that it is not practical at this time. Since the signal-to-noise ratio obtained is a direct function of the amount of the amount of redundancy which exists in the recorded holograms, it is desirable to further increase this redundancy without requiring a more complex nondiffusing plural beam redundance means. This is achieved by the present invention.

In the prior art, the distance by which the tape which comprises recording medium 306 is advanced by advancing means 308 is made substantially equal to or even slightly larger than the length "$h$" of the exposed area of a single recorded hologram. This results in adjacent holograms of the series of recorded holograms being disposed in juxtaposed, nonoverlapping, contiguous relationship with each other, as shown in FIG. 1. In the present invention, the distance by which the tape which comprises recording medium 306 is moved by advancing means 308 is made significantly smaller than the length "$h$." This results in adjacent holograms of the series being in partially overlapping relationship with respect to each other, as shown in FIG. 2. This effectively increases the redundancy and, hence, the signal-to-noise ratio obtained without increasing the complexity of nondiffusing plural beam redundancy means 324.

Referring now to FIG. 5, there is shown a preferred embodiment of a playback system of the present invention.

A transparent plastic tape 500 having a series of partially overlapping phase holograms impressed therein which are oriented along the length of the tape, such as shown in FIG. 2, and which were derived from a series of phase holograms recorded on a recording medium in the manner discussed above in connection with FIG. 3, is continuously moved by shutterless continuous drive means 502 past readout beam 504 of coherent wave energy from laser 506. Laser 506 operates at a wave length $\lambda_2$ which is either the same as or different from the wave length $\lambda_1$ employed in recording the phase holograms. In response thereto, a first order diffraction output beam 508 is obtained which contains the motion picture information recorded in holographic form in the series of phase holograms. Beam 508 is composed of components corresponding to each object point in the motion picture. Each of these components is a plane wave formed of parallel rays. In cooperative relationship with beam 508 is reconstructing convex lens 510, having a focal length $F_2$, which causes a reconstructed image of the phase hologram then being read out to be formed on photosensitive surface 512 of television camera means 514. This is true because photosensitive surface 512 is situated in the focal plane of lens 510. Television camera means 514 scans the reconstructed image on photosensitive surface 512 to convert it into a video signal, which is then passed through TV signal-translating means 516 to television viewing means 518. Elements 514, 516 and 518 constitute closed circuit television apparatus. Such apparatus may include as part thereof a home television receiver in which the kinescope thereof comprises television-viewing means 518.

The fact that each of the series of phase holograms on transparent tape 500 is a Fraunhoffer hologram not only causes first order diffraction output beam 508 to be formed of plane wave components, but permits transparent tape 500 to be continuously moved by shutterless means while being continuously illuminated by readout beam 504 without affecting the position of the reconstructed motion picture image on photosensitive surface 512. However, reconstructing lens 510 is required in order to reconstruct a motion picture image on surface 512 from the continuously moving, partially overlapping series of phase holograms on transparent tape 500.

Due to the fact that adjacent ones of the phase holograms on transparent tape 500 partially overlap each other, the reconstructed image of the motion picture displayed on photosensitive surface 512 will also include unwanted spatial beat frequencies, the lowest one of which has a frequency given by the following formula:

$$\omega = \frac{s}{\lambda_2 \sqrt{\frac{s^2}{4} + F_2^2}}$$

where "$s$" is the distance between corresponding pints of the closest subholograms which result as a consequence of both of the use of nondiffusing plural beam redundancy means 324, as discussed above in connection with FIG. 4, and the partial overlap of successive recorded holograms in the series, as shown in FIG. 2; $\lambda_2$ is the wavelength of readout laser 506; $F_2$ is the focal length of reconstructing lens 510; and $\omega$ is the value of the minimum spatial beat frequency appearing in the reconstructed motion picture image formed on photosensitive surface 512.

By way of example, for instance, the minimum spatial beat frequency can be made equal to about 16 cycles per millimeter by employing a readout laser having a wavelength of 633 nanometers with a reconstructing lens having a focal length of 50 millimeters, and by providing an amount of partial overlap between successive holograms of the series such that the closest spacing between two adjacent subholograms is about equal to 0.51 millimeters.

Spatial beat frequencies, which constitute unwanted noise, cannot be observed on television viewing means 518 if the ultimate resolution capability of the closed circuit television apparatus composed of photosensitive surface 512, television camera means 514, TV signal-translating means 516 and television viewing means 518 is made no greater than the minimum spatial beat frequency of the reconstructed motion picture image formed on photosensitive surface 512. In particular, in the case of the above example, the ultimate resolution capability of the closed circuit television apparatus or the motion picture image formed on photosensitive surface 512 is no greater than 16 cycles per millimeter. Therefore, the unwanted spatial beat frequencies which result from partial overlapping successive ones of the series of recorded phase holograms are effectively filtered out by the closed circuit television apparatus and do not degrade the motion picture displayed by television viewing means 518, which is watched by an observer of the motion picture being played back.

We claim:

1. In a system for playing back a motion picture record wherein successive frames of a motion picture are manifested by a series of successive phase holograms each of which has substantially the same given size, wherein said system includes said record, means for sequentially illuminating said phase holograms with a readout beam of wave energy to sequentially obtain reconstructed real images of said motion picture frames in a given area of space and image responsive means including a wave sensitive surface element coincident with said given area and means coupled to said element for viewing said motion picture, said image responsive means having a given resolution capability; the improvement therewith wherein each one of said phase holograms partially overlaps by a given amount both the phase hologram which immediately precedes and the phase hologram which immediately succeeds that one of said phase holograms in said series, whereby said reconstructed images of said phase holograms includes spatial beat frequencies having a minimum value which depends on said given amount of overlap, said given amount of overlap being of such a value that the value of said minimum spatial beat frequency is no less than said ultimate resolution capability of said image responsive means.

2. The system defined in claim 1, wherein said sequential illuminating means includes a laser for providing optical energy at a given wavelength for producing said readout beam and shutterless means coupled to said record for moving said series of phase holograms in sequence in cooperative relationship with said readout beam to continuously reconstruct real images of said motion picture frames in said given area of space and wherein said image responsive means comprises closed circuit television apparatus including television camera means having a photosensitive surface element coincident with said given area of space and television viewing means for displaying the reconstructed real images of said motion picture frames picked up by said television camera means.

3. The system defined in claim 2, wherein each of said phase holograms is a Fraunhoffer hologram, and wherein said sequential illuminating means further includes convex lens means having a given focal length, said lens lying in the path of a first order diffraction beam resulting from illumination of said phase holograms by said readout beam with said photosensitive surface element lying in the focal plane of said lens.

4. The system defined in claim 5, wherein each of said phase holograms is composed of redundant displaced overlapping subholograms, whereby said minimum beat frequency also depends upon the spacing between said subholograms and, hence, the amount of partial overlap between successive phase holograms of said series to maintain said minimum beat frequency no less than said ultimate resolution capability of said playback system is dependent upon the spacing between said subholograms.

5. The system defined in claim 1, wherein said record is a transparent tape having said phase holograms impressed thereon with said series oriented along the length of said tape.

* * * * *

UNITED STATES PATENT OFFICE
CERTIFICATE OF CORRECTION

Patent No. 3,632,869       Dated 1/4/72

Inventor(s) Robert Alfred Bartolini

It is certified that error appears in the above-identified patent and that said Letters Patent are hereby corrected as shown below:

Column 6, line 59, "claim 5" should read --claim 3--

Signed and sealed this 19th day of November 1974.

(SEAL)
Attest:

McCOY M. GIBSON JR.        C. MARSHALL DANN
Attesting Officer          Commissioner of Patents